(12) United States Patent
Namie

(10) Patent No.: US 12,197,175 B2
(45) Date of Patent: Jan. 14, 2025

(54) CONTROL DEVICE, CONTROL METHOD, AND NON-TRANSITORY COMPUTER-READABLE RECORDING MEDIUM RECORDING CONTROL PROGRAM

(71) Applicant: OMRON Corporation, Kyoto (JP)

(72) Inventor: Masaki Namie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 356 days.

(21) Appl. No.: 17/437,847

(22) PCT Filed: Mar. 6, 2020

(86) PCT No.: PCT/JP2020/009703
§ 371 (c)(1),
(2) Date: Sep. 10, 2021

(87) PCT Pub. No.: WO2020/189342
PCT Pub. Date: Sep. 24, 2020

(65) Prior Publication Data
US 2022/0171350 A1    Jun. 2, 2022

(30) Foreign Application Priority Data

Mar. 20, 2019  (JP) ................. 2019-052777

(51) Int. Cl.
*G05B 13/04*  (2006.01)
*G05B 17/02*  (2006.01)

(52) U.S. Cl.
CPC ......... *G05B 13/048* (2013.01); *G05B 13/042* (2013.01); *G05B 17/02* (2013.01)

(58) Field of Classification Search
CPC .... G05B 13/048; G05B 13/042; G05B 17/02; G05B 2219/42058; G05B 2219/45031; G05B 19/418; G05B 13/04; Y02P 90/02
See application file for complete search history.

(56) References Cited

U.S. PATENT DOCUMENTS

2003/0187521 A1*  10/2003  Tanaka ............... G05B 11/32
                                                                   700/20
2004/0098145 A1    5/2004  Zhenduo et al.
(Continued)

FOREIGN PATENT DOCUMENTS

CN        106575104        4/2017
CN        106909074        6/2017
(Continued)

OTHER PUBLICATIONS

Tange Yoshio, "Control Device, Control Method and Program" (espacenet english translation for application JP2019145098), Feb. 19, 2018, espacenet machine translation (Year: 2018).*
(Continued)

*Primary Examiner* — Christopher W Carter
(74) *Attorney, Agent, or Firm* — JCIPRNET

(57) ABSTRACT

Multiple control parts include a first control part and a second control part other than the first control part, the first control part showing the slowest response speed of a control amount with respect to a target value. A control device includes: a prediction part for predicting a future control amount for a first control target by using a first model indicating dynamic characteristics of the first control target corresponding to the first control part for each control cycle; and a generation part for generating a future target value of a second control target corresponding to the second control part from the future control amount. The second control part determines an operation amount for the second control target based on the future target value.

9 Claims, 11 Drawing Sheets

(56) References Cited

U.S. PATENT DOCUMENTS

| | | | |
|---|---|---|---|
| 2010/0087933 | A1 | 4/2010 | Cheng |
| 2016/0018796 | A1 | 1/2016 | Lu |
| 2017/0269616 | A1 | 9/2017 | Mimura |
| 2017/0278731 | A1 | 9/2017 | Mimura |
| 2018/0053668 | A1* | 2/2018 | Mimura ............. G05D 23/1934 |
| 2018/0053669 | A1 | 2/2018 | Mimura |
| 2018/0067460 | A1 | 3/2018 | Namie |
| 2018/0264649 | A1 | 9/2018 | Ojima et al. |

FOREIGN PATENT DOCUMENTS

| | | |
|---|---|---|
| CN | 107797446 | 3/2018 |
| DE | 102017115497 | 1/2019 |
| JP | 2009301258 | 12/2009 |
| JP | 2010266760 | 11/2010 |
| JP | 2016012228 | 1/2016 |
| JP | 2018041150 | 3/2018 |

OTHER PUBLICATIONS

Furusawa Koichi, "Device Model, System Model, System Model Generating System, and Program Generating System" (espacenet english translation for application JPH1063330), Aug. 27, 1996, espacenet machine translation (Year: 1996).*

Ping Zhou et al: "DOB Design for Nonminimum-Phase Delay Systems and Its Application in Multivariable MPC Control.", IEEE Transactions on Circuits and Systems II: Express Briefs, Aug. 2012, pp. 525-529.

"Search Report of Europe Counterpart Application", issued on Oct. 27, 2022, pp. 1-10.

"International Search Report (Form PCT/ISA/210) of PCT/JP2020/009703," mailed on Jun. 2, 2020, with English translation thereof, pp. 1-4.

"Written Opinion of the International Searching Authority (Form PCT/ISA/237) of PCT/JP2020/009703," mailed on Jun. 2, 2020, with English translation thereof, pp. 1-6.

"Office Action of China Counterpart Application", issued on Sep. 28, 2023, with English translation thereof, pp. 1-15.

* cited by examiner

CONTROL DEVICE, CONTROL METHOD, AND NON-TRANSITORY COMPUTER-READABLE RECORDING MEDIUM RECORDING CONTROL PROGRAM

CROSS-REFERENCE TO RELATED APPLICATION

This application is a 371 application of the International PCT application serial no. PCT/JP2020/009703, filed on Mar. 6, 2020, which claims the priority benefits of Japan Patent Application No. 2019-052777, filed on Mar. 20, 2019. The entirety of each of the above-mentioned patent applications is hereby incorporated by reference herein and made a part of this specification.

BACKGROUND

Technical Field

The disclosure relates to a control device, a control method and a non-transitory computer-readable recording medium recording a control program.

Conventionally, there has been known a technique for controlling multiple control targets so that the distribution of each control amount of the control targets becomes a desired distribution in a transient state.

For example, Japanese Laid-Open No. 2016-12228 (Patent Document 1) discloses a temperature control method for controlling the temperature of multiple temperature adjusting means in order to control the temperature of a semiconductor wafer to a desired distribution. The temperature control method disclosed in Patent Document 1 performs the following first to third procedures. The first procedure is a procedure for searching for an operation amount pattern for reaching the target temperature in the shortest time by assuming that the operation amount of the control loop having the slowest response speed among the control loops set in each of the temperature adjusting means is 100% and by using a normative model generated from responses of the other loops controlled to follow this control loop. The second procedure is a procedure for giving the operation amount of the searched optimal operation amount pattern to the normative model. The third procedure is a procedure for calculating the operation amount for the temperature adjusting means by executing a model-following servo calculation using the output of the obtained normative model as the normative model output.

RELATED ART

Patent Document

[Patent Document 1] Japanese Laid-Open No. 2016-12228

SUMMARY

Technical Problem

In Patent Document 1, the optimal operation amount pattern according to the target temperature is searched, and the reference trajectory which is the normative model output corresponding to the searched optimal operation amount pattern is calculated. Then, the operation amount is calculated using the reference trajectory. However, in Patent Document 1, since the trajectory is not corrected after the reference trajectory is determined, for example, when the response changes due to the influence of disturbance or the like in the control loop having the slowest response speed, the temperature distribution may deviate from the desired distribution in the transient state.

The disclosure has been made in view of the above problems, and the disclosure provides a control device, a control method, and a control program capable of restoring the distribution of control amounts of multiple control targets to a desired distribution in a transient state even when the response changes due to the influence of disturbance or the like.

Solution to the Problem

According to an example of the disclosure, a control device includes a plurality of control parts for controlling a plurality of control targets. Each of the control parts determines an operation amount for a corresponding control target among the control targets so that a control amount of the corresponding control target matches a target value for each control cycle. The control parts include a first control part having a slowest response speed of the control amount with respect to the target value and a second control part other than the first control part. The control device further includes: a prediction part for predicting a future control amount of a first control target that corresponds to the first control part among the control targets by using a first model showing dynamic characteristics of the first control target for each control cycle; and a generation part for generating a future target value of a second control target that corresponds to the second control part among the control targets from the future control amount. The second control part determines the operation amount for the second control target based on the future target value.

According to the above disclosure, the second control part generates the operation amount so that the control amount of the second control target follows the future target value generated from the future control amount of the first control target, and outputs the generated operation amount to the second control target. As a result, the first control target and the second control target are controlled so that the distribution of the control amounts in the transient state becomes a desired distribution. Further, the future control amount is predicted for each control cycle. Therefore, even when a disturbance or the like is applied to a control loop corresponding to the first control target and the response of the control loop changes, the future control amount is predicted according to the response after the change. As a result, even when the response changes due to the influence of disturbance or the like, the distribution of the control amounts of the plurality of control targets can be restored to a desired distribution in the transient state.

In the above disclosure, the first control part determines the operation amount for the first control target based on a step-like target value.

According to the simulation result shown in FIG. 14 of Patent Document 1, for the control loop with the slowest response speed, there is a period in which the operation amount is not saturated even though the deviation between the control amount and the target value is large. Therefore, it is considered that there is room for further shortening the settling time. However, according to the disclosure, the first control part determines the operation amount for the first control target based on the step-like target value, so that even though the distribution of the control amounts of the plurality of control targets is controlled to be a desired distribution, it is possible to suppress the lengthening of the settling time of the control system as a whole. In other words, the distribution of the control amounts of the first control target and the second control target in the transient state can be controlled to a desired distribution without sacrificing the settling time of the control system as a whole.

In the above disclosure, the first control part calculates an input value to the first model of each control cycle by model prediction control using the first model so that a required change amount for making the control amount of the first control target match the target value is output from the first model, and determines the input value of a current control cycle as the operation amount to the first control target. The prediction part predicts the future control amount by inputting the input value of a control cycle after the current control cycle into the first model.

According to the disclosure, the prediction part can predict the future control amount by using the calculation result of the first control part. As a result, the calculation load is reduced.

In the above disclosure, when the input value exceeds a predetermined upper limit value, the first control part corrects the input value to the upper limit value, and when the input value is lower than a predetermined lower limit value, the first control part corrects the input value to the lower limit value.

According to the disclosure, the model output is calculated using the operation amount corrected to the upper limit value or the lower limit value due to saturation, and a decrease in prediction accuracy can be avoided.

In the above disclosure, the second control part determines the operation amount for the second control target by model prediction control using a second model showing dynamic characteristics of the second control target.

According to the disclosure, the second control part can generate the operation amount using the future target value generated by the generation part.

In the above disclosure, the generation part generates the future control amount, a value obtained by adding a predetermined bias to the future control amount, or a value obtained by multiplying the future control amount by a predetermined ratio as the future target value.

According to the disclosure, the distribution of the control amounts of the first control target and the second control target can be controlled to any one of a uniform distribution, a distribution having a predetermined bias difference, and a distribution having a predetermined ratio.

In the above disclosure, the control amount is, for example, a temperature, a pressure, a flow rate or a load. According to the disclosure, the control device 1 can control the distribution of the temperature, the pressure, the flow rate or the load of the plurality of control targets in the transient state to a desired distribution.

According to an example of the disclosure, a control method of a control system including a plurality of control parts respectively corresponding to a plurality of control targets includes the following first to third steps. Each of the control parts determines an operation amount for a corresponding control target among the control targets so that a control amount of the corresponding control target matches a target value. The control parts include a first control part having a slowest response speed of the control amount with respect to the target value and a second control part other than the first control part. The first step is predicting a future control amount of a first control target that corresponds to the first control part among the control targets by using a first model showing dynamic characteristics of the first control target for each control cycle. The second step is generating a future target value of a second control target that corresponds to the second control part among the control targets from the future control amount. The third step is outputting the future target value to the second control part and determining the operation amount for the second control target based on the future target value.

According to an example of the disclosure, a non-transitory computer-readable recording medium records a control program that causes a computer to execute the above control method.

According to the above disclosures, even when the response changes due to the influence of disturbance or the like, the distribution of the control amounts of the plurality of control targets can be restored to a desired distribution in the transient state.

Effects

According to the disclosure, even when the response changes due to the influence of disturbance or the like, the distribution of the control amounts of the control targets can be restored to a desired distribution in the transient state.

DESCRIPTION OF THE EMBODIMENTS

Figure 1:
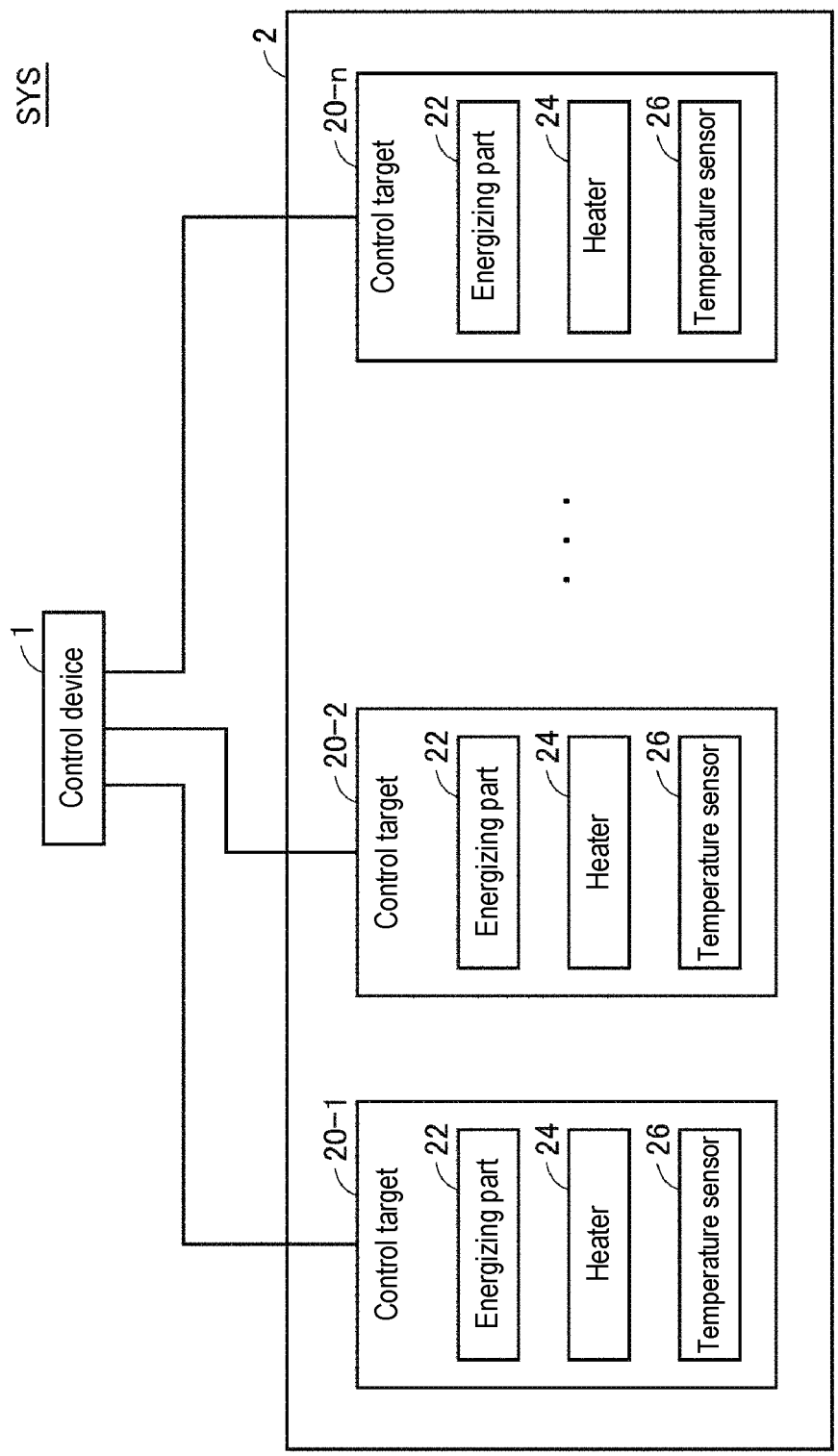
FIG. 1 is a schematic diagram showing an example of the overall configuration of a control system to which a control device according to the embodiment is applied.

Embodiments of the disclosure will be described in detail below with reference to the drawings. Further, in the drawings, the same or corresponding parts are denoted by the same reference numerals, and descriptions thereof will not be repeated.

§ 1 Application Example

Figure 2:
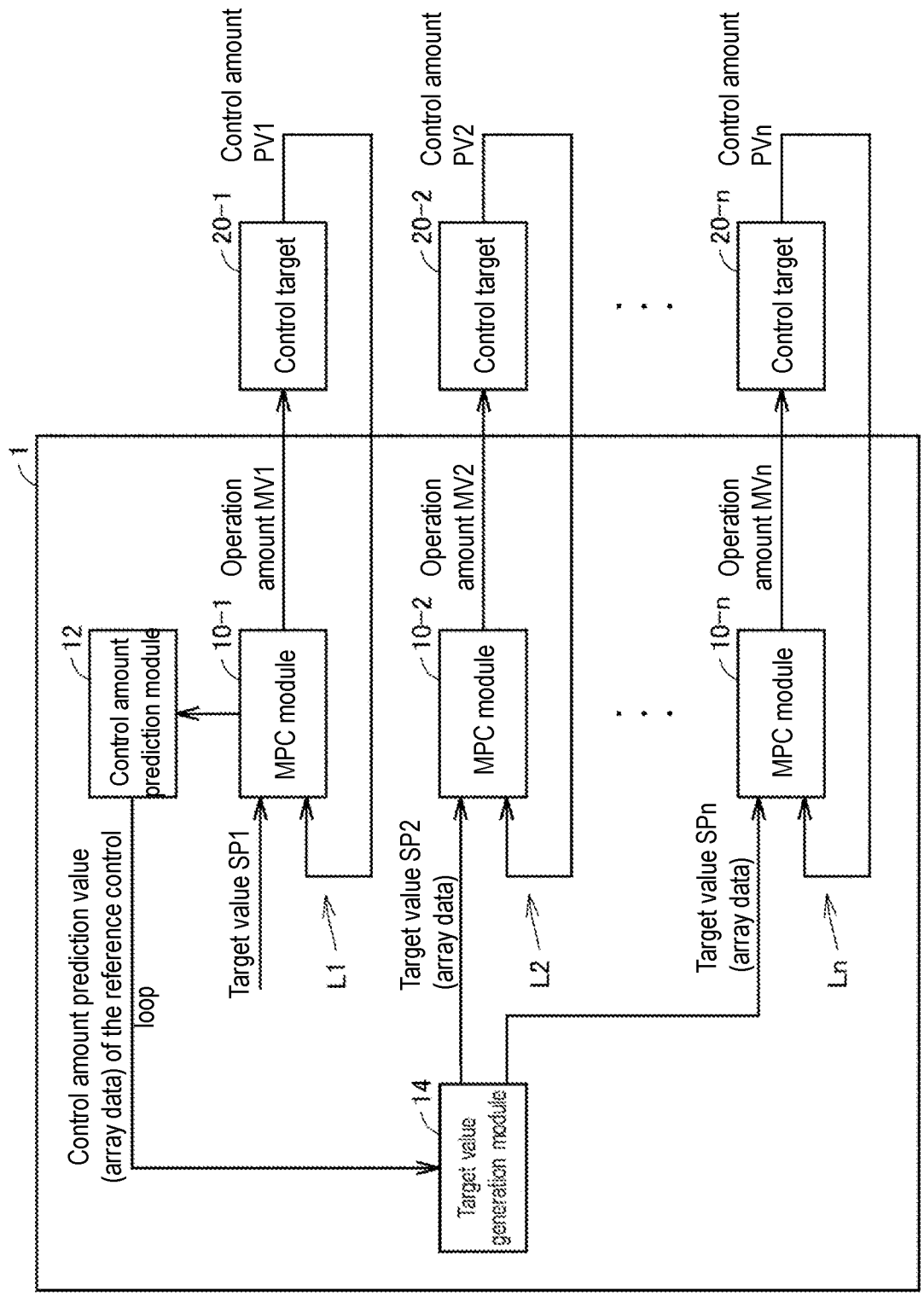
FIG. 2 is a diagram showing an example of the internal configuration of the control device according to the embodiment.

First, an example of the scenario in which the disclosure is applied is described with reference to FIG. 1 and FIG. 2. FIG. 1 is a schematic diagram showing an example of the overall configuration of a control system to which a control device according to the embodiment is applied. FIG. 2 is a diagram showing an example of the internal configuration of the control device according to the embodiment.

A control system SYS in the example shown in FIG. 1 includes a heating device 2 and a control device 1 that controls the temperature distribution of the heating device 2.

The heating device 2 is, for example, a heat treatment furnace or a semiconductor wafer heat treatment device. The heating device 2 includes multiple control targets corresponding to multiple control points. In the example shown in FIG. 1, the heating device 2 includes n (n is an integer of 2 or more) control targets 20-1 to 20-$n$.

Each of the control targets 20-1 to 20-$n$ has an energizing part 22, a heater 24, and a temperature sensor 26. The energizing part 22 passes a current corresponding to an operation amount received from the control device 1 through the heater 24. The temperature sensor 26 measures the temperature of the corresponding control point and outputs the measured temperature to the control device 1 as a control amount of the control target.

The control device 1 outputs operation amounts to the n control targets 20-1 to 20-$n$ included in the heating device 2 to control the control amounts (here, temperature) of the n control targets 20-1 to 20-$n$. As shown in FIG. 2, the control device 1 includes n model prediction control modules 10-1 to 10-$n$ that control the n control targets 20-1 to 20-$n$, respectively. In the drawing, the model prediction control is referred to as "MPC (model prediction control)."

A model prediction control module 10-$i$ (i is an integer of 1 to n) and a control target 20-$i$ corresponding to the model prediction control module 10-$i$ configure one control loop L$i$. Therefore, the control system SYS has n control loops L1 to Ln. In the control loop L$i$ configured by the model prediction control module 10-$i$ and the control target 20-$i$, a control amount PV$i$ of the control target 20-$i$ is measured by the temperature sensor 26 (see FIG. 1) and input to the model prediction control module 10-$i$. The model prediction control module 10-$i$ determines an operation amount MV$i$ for the control target 20-$i$ so that the input control amount PV$i$ and a target value SP$i$ match. In the control target 20-$i$, the heater 24 is operated based on the operation amount MV$i$ from the model prediction control module 10-$i$.

The response speed of the control amount to the target value (that is, the speed from when the target value is given until the control amount reaches the target value) differs for each control loop depending on the environment around the control target and the performance of the control target. For example, the control target disposed at the end of the heating device 2 has a larger heat radiation amount than other control targets. Therefore, the response speed of the control loop configured by the control target disposed at the end of the heating device 2 becomes relatively slow.

When the response speed is different for each control loop, the distribution of the control amounts PV1 to PV$n$ of the n control targets 20-1 to 20-$n$ vary in the transient state. For example, even if the same step-like target value is given to all the control loops L1 to Ln, the control amount of the control target configuring the control loop having a fast response speed reaches the target value at a timing earlier than other control loops. On the other hand, the control amount of the control target configuring the control loop having a slow response speed reaches the target value at a timing later than other control loops. Therefore, if the distribution of the control amounts PV1 to PV$n$ of the n control targets 20-1 to 20-$n$ varies in the transient state, the object to be heated (such as a semiconductor wafer) may be adversely affected. For example, due to temperature unevenness, unintended deformation of the object may occur.

In the control device 1 according to the embodiment, in order to solve such a problem, the n control targets 20-1 to 20-$n$ are controlled so that the distribution of the control amounts PV1 to PV$n$ of the n control targets 20-1 to 20-$n$ in the transient state becomes a desired distribution (for example, uniform distribution). That is, the control device 1 specifies the control loop having the slowest response speed as the "reference control loop" and the remaining control loops as the "follow-up control loops." Then, the control device 1 controls the n control targets 20-1 to 20-$n$ so that the control amounts of the follow-up control loops follow the control amount of the reference control loop.

The response speed of each control loop is evaluated in advance by measuring it from the time when the same step-like target value is given to the model prediction control modules 10-1 to 10-$n$ when the heating device 2 is in a steady state until the time when the control amounts of the control targets 20-1 to 20-$n$ reach the target value. Based on the evaluation result, the control loop having the slowest response speed among the n control loops is specified in advance as the reference control loop, and the control loops other than the reference control loop are specified in advance as the follow-up control loops. In the example shown in FIG. 2, the control loop L1 configured by the model prediction control module 10-1 and the control target 20-1 is specified as the reference control loop, and the other control loops L2 to Ln are specified as the follow-up control loops.

A predetermined target value SP1 is input to the model prediction control module 10-1 configuring the reference control loop L1. In order to shorten the settling time as much as possible, it is preferable to input the step-like target value SP1 to the model prediction control module 10-1. That is, the target value SP1 indicating the final target temperature is input to the model prediction control module 10-1 from the start of control.

The control device 1 further includes a control amount prediction module 12 and a target value generation module 14 as modules for making the control amounts PV2 to PV$n$ of the control loops L2 to Ln follow the control amount PV1 of the reference control loop L1.

The control amount prediction module 12 predicts the prediction value of the future control amount (hereinafter referred to as the "control amount prediction value PVP") of the control target 20-1 by using a dynamic characteristic model showing the dynamic characteristics of the control target 20-1 that configures the reference control loop L1 for each control cycle. As will be described later, the control amount prediction module 12 calculates the control amount prediction value PVP by using the calculation result when the model prediction control module 10-1 determines the operation amount MV1.

The target value generation module 14 generates future target values SP2 to SP$n$ of the follow-up control loops L2 to Ln from the control amount prediction value PVP predicted by the control amount prediction module 12. For example, when uniformizing the distribution of control amounts of multiple control targets in a transient state, the target value generation module 14 determines the control amount prediction value PVP as the target values SP2 to SP$n$.

The target value generation module 14 outputs the generated target values SP2 to SPn to the model prediction control modules 10-2 to 10-n, respectively. As a result, the model prediction control module 10-j (j is an integer of 2 to n) generates the operation amount MVj so that the control amount PVj of the control target 20-j follows the target value generated from the control amount prediction value PVP of the reference control loop L1. The model prediction control module 10-j outputs the generated operation amount MVj to the control target 20-j. As a result, the distribution of the control amounts of the control targets 20-1 to 20-n in the transient state is controlled to a desired distribution (for example, uniform distribution).

As described above, the control amount prediction value PVP is predicted for each control cycle. Therefore, even when a disturbance or the like is applied to the reference control loop L1 and the response of the reference control loop L1 changes, the control amount prediction value PVP is predicted according to the response after the change. As a result, even when the response changes due to the influence of disturbance or the like, the distribution of the control amounts of the n control targets 20-1 to 20-n can be restored to a desired distribution in the transient state.

§ 2 Specific Example

Next, a specific example of the control device 1 according to the embodiment will be described.

A. HARDWARE CONFIGURATION EXAMPLE OF THE CONTROL DEVICE

The control device 1 according to the embodiment is realized by, for example, a general-purpose computer, a programmable logic controller (PLC), or the like. The control device 1 may realize the processing described later by executing a control program (including a system program and a user program described later) stored in advance by a processor.

Figure 3:
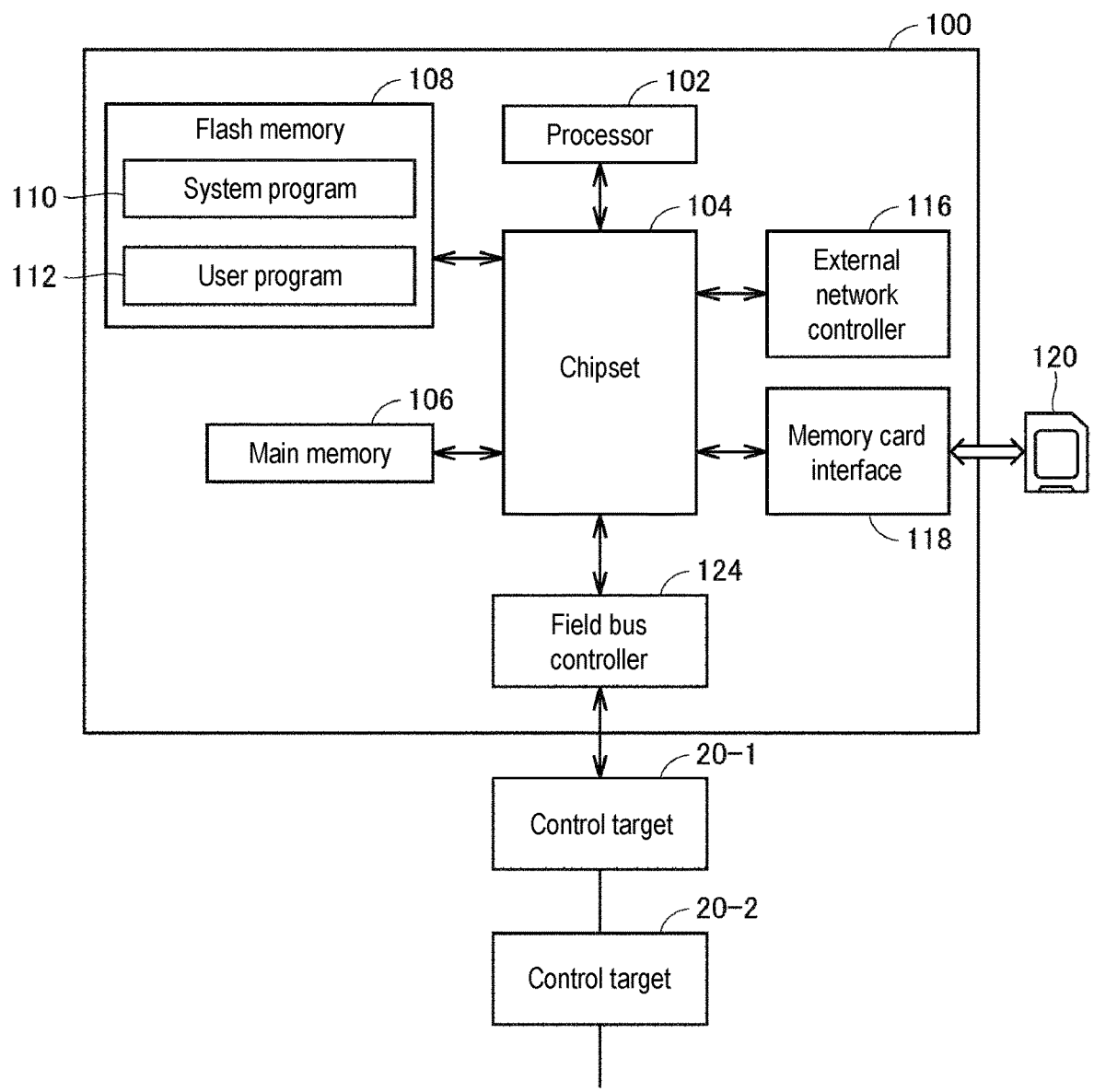
FIG. 3 is a schematic diagram showing an example of the hardware configuration of the control device according to the embodiment.

FIG. 3 is a schematic diagram showing an example of the hardware configuration of the control device 1 according to the embodiment. FIG. 3 shows an example of the control device 1 configured as a PLC temperature control unit. As shown in FIG. 3, the control device 1 includes a processor 102, such as a central processing unit (CPU) or a microprocessing unit (MPU), a chipset 104, a main memory 106, a flash memory 108, an external network controller 116, a memory card interface 118, and a field bus controller 124.

The processor 102 reads a system program 110 and a user program 112 stored in the flash memory 108, expands them in the main memory 106, and executes them to realize desired control over the control targets. By executing the system program 110 and the user program 112, the processor 102 outputs the operation amounts to the control targets 20-1 to 20-n, executes the processing related to the data communication, and the like, which will be described later.

The system program 110 includes an instruction code for providing basic functions of the control device 1 such as the data input/output processing and the execution timing control. The user program 112 is designed as desired according to the control targets 20-1 to 20-n, and includes a sequence program for executing sequence control.

The model prediction control modules 10-1 to 10-n, the control amount prediction module 12, and the target value generation module 14 shown in FIG. 2 are realized by the processor 102 executing the system program 110 and the user program 112.

The chipset 104 realizes the processing of the control device 1 as a whole by controlling each component.

The field bus controller 124 is an interface for exchanging data with various devices connected to the control device 1 through the field bus. As an example of such devices, the control targets 20-1, 20-2, . . . are connected.

The field bus controller 124 can give any command to the connected devices and can acquire any data (including the control amount PV) managed by the devices. The field bus controller 124 also functions as an interface for exchanging data with the n control targets 20-1 to 20-n.

The external network controller 116 controls the exchange of data through various wired/wireless networks. The memory card interface 118 is configured to allow a memory card 120 to be attached thereto or detached therefrom, and is capable of writing data to the memory card 120 and reading data from the memory card 120.

B. MODEL PREDICTION CONTROL

The model prediction control module 10-i generates the operation amount MVi to the control target 20-i by performing model prediction control using a dynamic characteristic model showing the dynamic characteristics of the corresponding control target 20-i.

The dynamic characteristic model is, for example, created in advance by tuning before executing the model prediction control. For example, the same step-like operation amount is simultaneously output to all of the n control targets 20-1 to 20-n of the heating device 2 in the steady state, and the control amount (temperature) of each control target is measured. By applying the system identification method using the operation amount and the control amount as the identification input and the identification output, respectively, it is possible to create a dynamic characteristic model of each control target.

The dynamic characteristic model is represented by, for example, the following function $P(z^{-1})$. The function $P(z^{-1})$ is a discrete-time transfer function that combines a dead time element and a p-th order lag element. In the dynamic characteristic model represented by the function $P(z^{-1})$, the dead time d of the dead time element and the variables $a_1$ to $a_p$ and the variables $b_1$ to $b_q$ of the p-th order lag element are determined as characteristic parameters. The optimal values may also be determined for the order p and the order q.

$$P(z^{-1}) = z^{-d} \frac{b_1 z^{-1} + b_2 z^{-2} + \cdots + b_q z^{-q}}{1 + a_1 z^{-1} + a_2 z^{-2} + \cdots + a_q z^{-q}} \qquad \text{[Equation 1]}$$

The processing of creating such characteristic parameters (that is, system identification) may be performed using the identification input and the identification output, such as by the least squares method. Specifically, each value of the characteristic parameter is determined so that the output y when the operation amount selected as the identification input is given to the variable u of $y = P(z^{-1}) * u$ matches the control amount selected as the identification output (that is, so that the error is minimized).

The above characteristic parameters (d, $a_1$ to $a_p$, $b_1$ to $b_q$) are determined for each control target. Hereinafter, in order to distinguish the dead time d for each control target, the dead time d corresponding to the control target 20-i is referred to as the "dead time d_i" as necessary.

There are multiple methods for model prediction control, and the method of calculating the operation amount using the predictive functional control (PFC) method, which has a low calculation load, will be described below. However, the model prediction control modules 10-1 to 10-n are not limited to the PFC method, and the operation amount may be calculated using other methods.

Each of the model prediction control modules 10-1 to 10-n calculates the model output value $Y_{k+d+1}$ in the control cycle k+d+1 by inputting the operation amounts $MV_k, \ldots, MV_{k-q+1}$ generated until the current control cycle k into the dynamic characteristic model represented by the function $P(z^{-1})$ of the above [Equation 1]. Here, q is the order defined by the dynamic characteristic model P as described above. Further, the control cycle k+d+1 is a future control cycle in which the dead time d+1 defined in the dynamic characteristic model has elapsed from the current control cycle k.

The model output value $Y_{k+d+1}$ obtained as described above is used to generate the operation amount MV in the next control cycle. At this time, the calculated data is shifted by one control cycle in preparation for the next control cycle. For example, the model output value $Y_{k+d+1}$ obtained as described above is used as the model output value $Y_{k+d}$ in the next control cycle. In other words, the model output value $Y_{k+d+1}$ calculated in the previous control cycle is used as the model output value $Y_{k+d}$ in the current control cycle k. Each of the model prediction control modules 10-1 to 10-n generates the operation amount $MV_k$ to be output in the current control cycle k by model prediction control using the model output value $Y_{k+d}$ calculated in the previous control cycle and the dynamic characteristic model.

Each of the model prediction control modules 10-1 to 10-n performs step response calculation and ramp response calculation in advance using the dynamic characteristic model.

The step response calculation is a calculation for obtaining the output of the dynamic characteristic model (hereinafter also referred to as the "step output Ys") when the maximum input (step input) is continued in the initial state where the output is 0. In the following description, the step output Ys at the elapsed time t (>dead time d) from the start of the input of the step input is defined as Ys(t).

The ramp response calculation is a calculation for obtaining the output of the dynamic characteristic model (hereinafter also referred to as the "ramp output Yr") when an input (ramp input) increased by a predetermined amount for each control cycle is performed in the initial state where the output is 0. In the following description, the ramp output Yr at the elapsed time t (>dead time d) from the start of the input of the ramp input is defined as Yr(t).

Further, each of the model prediction control modules 10-1 to 10-n performs a free response calculation with the model output values $Y_{k+d}, \ldots, Y_{k+d-p+1}$ as the initial state. The free response calculation is a calculation for obtaining the output Yf(k+d+H) of the dynamic characteristic model in the control cycle k+d+H in which a prediction horizon H has elapsed from the control cycle k+d when the input after the current control cycle k is set to 0 in the dynamic characteristic model in the initial state.

Each of the model prediction control modules 10-1 to 10-n calculates the output $MH_{k+d+H}$ of the dynamic characteristic model in the control cycle k+d+H in which the prediction horizon H has elapsed from the control cycle k+d with the magnitudes of the step output and ramp output as ks and kr, respectively, according to the following equation.

$$MH_{k+d+H}=ks*Ys(d+H)+kr*Yr(d+H)+Yf(k+d+H)$$

Each of the model prediction control modules 10-1 to 10-n obtains ks and kr so that the difference ΔMH between $MH_{k+d+H}$ and the model output value $Y_{k+d}$ and the difference ΔPH between the position $RH_{k+d+H}$ on the reference orbit in the control cycle k+d+H and the control amount $PV_{k+d}$ in the control cycle k+d match. The reference orbit is specified by a target value $SP_{k+d+H}$ in the control cycle k+d+H, a target value $SP_{k+d}$ and a control amount $PV_{k+d}$ in the control cycle k+d, and a predetermined reference orbit time constant Tr. The control amount $PV_{k+d}$ in the control cycle k+d is calculated by the following equation using the change amount $(Y_{k+d}-Y_k)$ of the output value of the dynamic characteristic model for the dead time d.

$$PV_{k+d}=PV_k+Y_{k+d}-Y_k$$

Two values H1 and H2 are set as the prediction horizon H in order to obtain the two variables ks and kr. In this way, each of the model prediction control modules 10-1 to 10-n calculates ks and kr that make the difference ΔMH and the difference ΔPH match by receiving the target values $SP_{k+d}$, $SP_{k+d+H1}$, and $SP_{k+d+H2}$ and the control amount $PV_k$.

Figure 4:
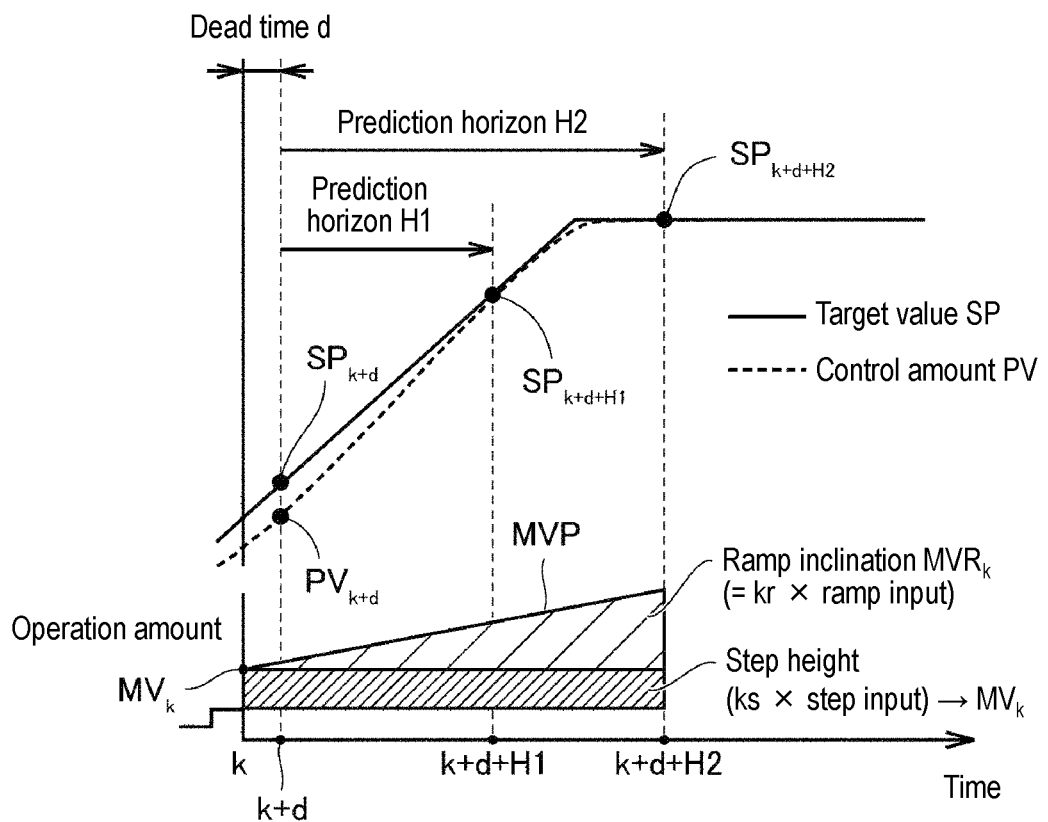
FIG. 4 is a diagram showing a relationship between the target value, the control amount, and the operation amount from the current control cycle until the dead time+the prediction horizon elapse.

FIG. 4 is a diagram showing a relationship between the target value, the control amount, and the operation amount from the current control cycle k until the dead time d+the prediction horizon H2 elapse. The above difference ΔPH corresponds to the required change amount for matching the control amount $PV_{k+d}$ in the control cycle k+d with the target value $SP_{k+d+H}$ in the control cycle k+d+H. Therefore, the variables ks and kr when the difference ΔMH matches the difference ΔPH indicate the model input value MVP to the dynamic characteristic model of each control cycle until the control cycle k+d+H2 for outputting the required change amount from the dynamic characteristic model. In other words, by outputting the model input value MVP indicated by the obtained variables ks and kr to the control target as an operation amount, the control amount can be matched with the target value at two points of the control cycle k+d+H1 and the control cycle k+d+H2.

As shown in FIG. 4, the variable ks represents the step height of the model input value MVP in each control cycle after the current control cycle k. The variable kr represents the step inclination of the operation amount in each control cycle after the current control cycle k. Each of the model prediction control modules 10-1 to 10-n calculates the variables ks and kr for matching the difference ΔMH with the difference ΔPH for each control cycle. The ramp input in the current control cycle k is 0. Therefore, each of the model prediction control modules 10-1 to 10-n may generate the product of ks obtained as described above and the step input (model input value MVP in the control cycle k) as the operation amount $MV_k$ of the current control cycle k.

Further, the operation amount can take a value within the range between a lower limit value MVL and an upper limit value MVH. Therefore, when the product of ks and the step input (model input value MVP in the control cycle k) exceeds the upper limit value MVH, each of the model prediction control modules 10-1 to 10-n generates the upper limit value MVH as the operation amount $MV_k$ of the current control cycle k. Similarly, when the product of ks and the step input is less than the lower limit value MVL, each of the model prediction control modules 10-1 to 10-n generates the lower limit value MVL as the operation amount $MV_k$ of the current control cycle k.

Further, the model prediction control parameters set in the model prediction control modules 10-1 to 10-n may be different for each of the model prediction control modules 10-1 to 10-n. The model prediction control parameters include the prediction horizons H1 and H2, and the reference orbit time constant Tr. As described above, the response speed differs for each control loop. Normally, the model prediction control module of the control loop having a relatively fast response speed is set with the prediction horizons H1 and H2 and the reference orbit time constant Tr that are shorter than those of the model prediction control module of the control loop having a relatively slow response speed. Therefore, the prediction horizons H1 and H2 and the reference orbit time constant Tr set in the model prediction control module 10-1 are respectively longer than the prediction horizons H1 and H2 and the reference orbit time constant Tr set in the model prediction control modules 10-2 to 10-$n$.

Hereinafter, in order to distinguish the prediction horizons H1 and H2 set in the model prediction control modules 10-1 to 10-$n$, the prediction horizons H1 and H2 set in the model prediction control module 10-$i$ are referred to as "the prediction horizon H1_$i$" and "the prediction horizon H2_$i$," respectively, as necessary.

C. METHOD OF PREDICTING THE CONTROL AMOUNT PREDICTION VALUE PVP

Next, a method of predicting the control amount prediction value PVP by the control amount prediction module 12 will be described.

First, the control amount prediction module 12 calculates the control amount prediction value PVP of control cycles k+1 to k+d based on the past operation amounts $MV_{k-1}$, $MV_{k-2}$, ... generated by the model prediction control module 10-1 configuring the reference control loop L1.

For example, an example in which the dynamic characteristic model is represented by the function $P(z^{-1})$ of the following [Equation 2] will be described.

$$P(z^{-1}) = z^{-d}\frac{b_1 z^{-1}}{1 + a_1 z^{-1}} \quad \text{[Equation 2]}$$

The control amount prediction module 12 may predict the control amount prediction values $PVP_{k+1}$ to $PVP_{k+d}$ in the control cycles k+1 to k+d according to the following equations.

$$PVP_{k+1} = -a_1 PVP_k + b_1 MV_{k-d}$$

$$PVP_{k+2} = -a_1 PVP_{k+1} + b_1 MV_{k-d+1}$$

...

$$PVP_{k+d} = -a_1 PVP_{k+d-1} + b_1 MV_{k-1}$$

Next, by using the model input value MVP to the dynamic characteristic model of each control cycle until the control cycle k+d_1+H2_1 (hereinafter referred to as the "control cycle k+Hpv") calculated by the model prediction control module 10-1, the control amount prediction module 12 calculates the control amount prediction values $PVP_{k+d+1}$ to $PVP_{k+Hpv}$ of the control cycles k+d+1 to k+Hpv, respectively.

As shown in FIG. 4, the model input value MVP to the dynamic characteristic model is defined by the step height (the product of ks and the step input) and the ramp inclination $MVR_k$. The ramp inclination $MVR_k$ corresponding to the current control cycle k is indicated by the product of kr and the ramp input obtained together with ks when the operation amount $MV_k$ of the current control cycle k is generated.

The model input value $MVP_{k+s}$ in the control cycle k+s in which s control cycles has elapsed from the current control cycle k is represented by the following equation.

$$MVP_{k+s} = MV_k + MVR_k \times s$$

However, when $MVP_{k+s}$ exceeds the upper limit value MVH of the operation amount, $MVP_{k+s}$ is corrected to the upper limit value MVH. Similarly, when $MVP_{k+s}$ is less than the lower limit value MVL of the operation amount, $MVP_{k+s}$ is corrected to the lower limit value MVL.

The control amount prediction module 12 predicts the control amount prediction values $PVP_{k+d+1}$ to $PVP_{k+Hpv}$ of the control cycles k+d+1 to k+Hpv, respectively, by inputting the model input value $MVP_{k+s}$ obtained in this way into the dynamic characteristic model showing the dynamic characteristics of the control target 20-1.

When the dynamic characteristic model is represented by the function $P(z^{-1})$ of the following [Equation 2], the control amount prediction module 12 may calculate the control amount prediction values $PVP_{k+d+1}$ to $PVP_{k+Hpv}$ according to the following equations.

$$PVP_{k+d+1} = -a_1 PVP_{k+d} + b_1 MV_k$$

$$PVP_{k+d+2} = -a_1 PVP_{k+d+1} + b_1 MVP_{k+1}$$

...

$$PVP_{k+Hpv} = -a_1 PVP_{k+Hpv-1} \pm b_1 MVP_{k+Hpv-d-1}$$

$MV_k$ indicates the operation amount in the current control cycle k generated by the model prediction control module 10-1.

The control amount prediction value PVP generally contains an error. Therefore, the control amount prediction module 12 may correct the control amount prediction value PVP by using the control amount $PV_k$ measured in the current control cycle k.

Specifically, the control amount prediction module 12 calculates the difference value between the control amount $PV_k$ in the current control cycle k and the control amount prediction value $PVP_k$ corresponding to the current control cycle k calculated in the past as a correction amount C. That is, the correction amount C is represented by $$C = PV_k - PVP_k.$$

The control amount prediction module 12 may consider that there is an error by the amount of the correction amount C in the control cycles k+1 to k+Hpv as well, and correct the control amount prediction values $PVP_{k+1}$ to $PVP_{k+Hpv}$ according to the following equations.

$$PVP_{k+1} \leftarrow PVP_{k+1} + C$$

...

$$PVP_{k+Hpv} \leftarrow PVP_{k+Hpv} + C$$

D. METHOD OF GENERATING FUTURE TARGET VALUES OF THE FOLLOW-UP CONTROL LOOPS

Next, a method of generating future target values SP2 to SPn of the follow-up control loops L2 to Ln by the target value generation module 14 will be described.

As described above, each of the model prediction control modules 10-2 to 10-$n$ obtains ks that makes the difference ΔMH and the difference ΔPH match by using the target values $SP_{k+d}$, $SP_{k+d+H1}$, and $SP_{k+d+H2}$, and uses the ks to generate the operation amount $MV_k$. Therefore, the target value generation module 14 generates the target values $SP_{k+d}$, $SP_{k+d+H1}$, and $SP_{k+d+H2}$, to be output to each of the model prediction control modules 10-2 to 10-$n$ from the control amount prediction values $PVP_{k+1}$ to $PVP_{k+Hpv}$ of the control cycles k+1 to k+Hpv.

Figure 5:
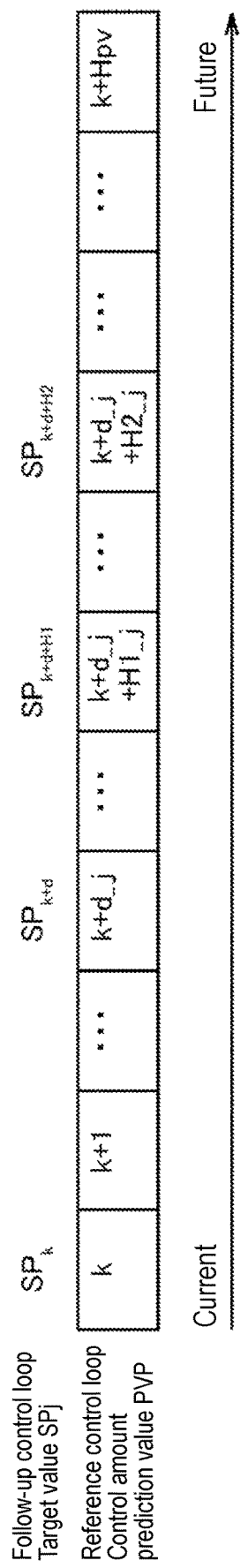
FIG. 5 is a diagram illustrating a method of generating the future target values of the follow-up control loops.

FIG. 5 is a diagram illustrating a method of generating the future target values of the follow-up control loops. FIG. 5 shows a method of generating a target value SPj to be output to the model prediction control module 10-$j$ of the follow-up control loop Lj.

As shown in FIG. 5, the target value generation module 14 generates the control amount prediction value $PVP_{k+d\_j}$ of the control cycle k+d_j, in which the dead time d_j specified in the dynamic characteristic model of the control target 20-$j$ has elapsed from the current control cycle k, as the target value $SP_{k+d}$ of the control target 20-$j$.

Similarly, the target value generation module 14 generates the control amount prediction value $PVP_{k+d\_j+H1\_j}$ of the control cycle k+d_j+H1_j, in which d_j+H1_j has elapsed from the current control cycle k, as the target value $SP_{k+d+H1}$ of the control target 20-$j$. Further, the target value generation module 14 generates the control amount prediction value $PVP_{k+d\_j+H2\_j}$ of the control cycle k+d_j+H2_j, in which d_j+H2_j has elapsed from the current control cycle k, as the target value $SP_{k+d}$+H2 of the control target 20-$j$.

As described above, the prediction horizons H1 and H2 of the reference control loop L1 having the slowest response speed are usually set longer than the prediction horizons H1 and H2 of the other follow-up control loops L2 to Ln. Therefore, the target value generation module 14 can generate the target values $SP_{k+d}$, $SP_{k+d+H1}$, and $SP_{k+d+H2}$ to be output to each of the model prediction control modules 10-2 to 10-$n$ from the control amount prediction values $PVP_{k+1}$ to $PVP_{k+Hpv}$.

Among the control amount prediction values $PVP_{k+1}$ to $PVP_{k+Hpv}$, the control amount prediction value PVP prior to the control cycle in which the longest d+H2 in the follow-up control loops L2 to Ln has elapsed from the current control cycle k is not used to generate the target value. Therefore, the control amount prediction module 12 may set the longest d+H2 in the follow-up control loops L2 to Ln as Hpv, and predict the control amount prediction values $PVP_{k+1}$ to $PVP_{k+Hpv}$ of the control cycles k+1 to k+Hpv, respectively.

E. PROCESSING PROCEDURE

Figure 6:
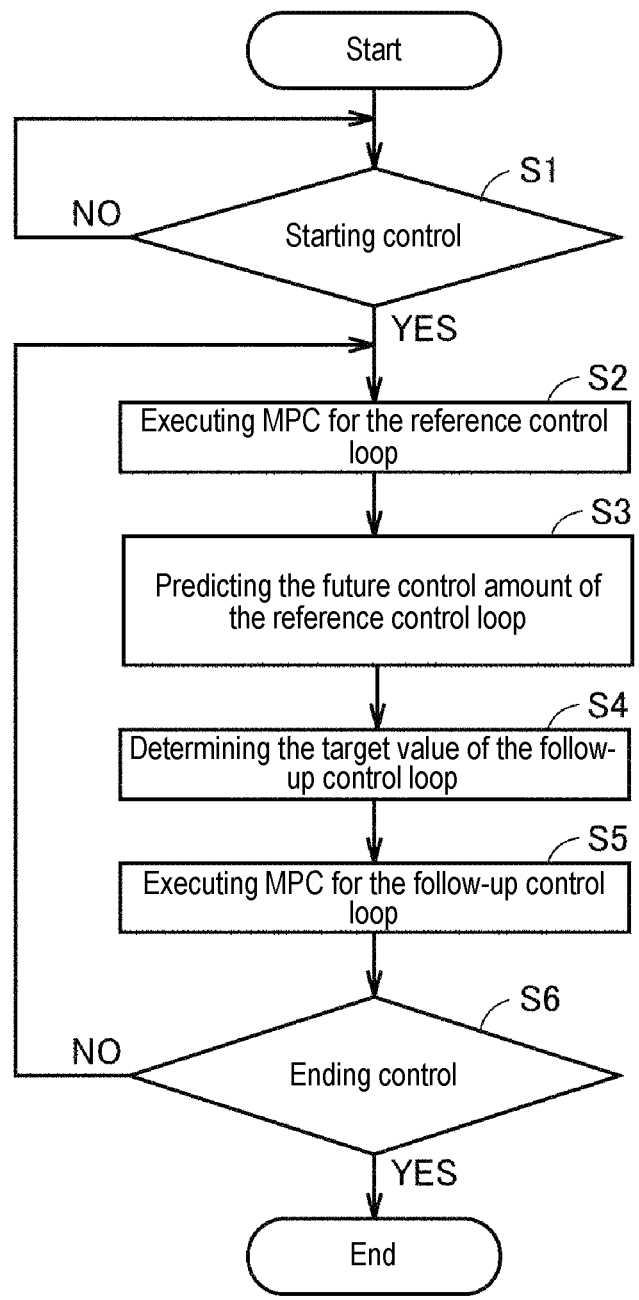
FIG. 6 is a flowchart showing a processing procedure of the control device according to the embodiment.

Next, an outline of the processing procedure by the control device 1 according to the embodiment will be described. FIG. 6 is a flowchart showing a processing procedure of the control device according to the embodiment. The steps shown in FIG. 6 may be realized by the processor 102 of the control device 1 executing the control program (including the system program 110 and the user program 112 shown in FIG. 3).

First, the control device 1 determines whether to start the control (step S1). For example, the control device 1 may determine to start the control by confirming the states of the control targets 20-1 to 20-$n$ and other devices and receiving the notification of the completion of preparation from each device. When it is determined not to start the control (NO in step S1), the processing of the control device 1 is returned to step S1.

When it is determined to start the control (YES in step S1), the control device 1 executes model prediction control for the reference control loop L1 and generates the operation amount MV1 for the control target 20-1 (step S2). The model prediction control in the reference control loop L1 is executed based on the predetermined target value SP1.

Next, the control device 1 predicts the future control amount prediction value PVP of the control target 20-1 configuring the reference control loop L1 (step S3). The control amount prediction value PVP is predicted using the variables ks and kr calculated when the operation amount MV1 is generated in step S2.

Next, the control device 1 generates the future target values SP2 to SPn of each of the follow-up control loops L2 to Ln from the control amount prediction value PVP (step S4).

Next, the control device 1 executes model prediction control for each of the follow-up control loops L2 to Ln, and generates the operation amounts MV2 to MVn for the control targets 20-2 to 20-$n$, respectively (step S5). The model prediction control of the follow-up control loops L2 to Ln is executed based on the target values SP2 to SPn generated in step S4, respectively.

Next, the control device 1 determines whether the control should be ended (step S6). For example, the control device 1 may determine to end the control when it receives an end instruction from a higher-level control unit. When it is determined not to end the control (NO in step S6), the processing of the control device 6 is returned to step S2. As a result, steps S2 to S5 are repeated for each control cycle.

When it is determined to end the control (YES in step S6), the processing of the control device 1 is ended.

F. SIMULATION RESULTS (F-1. First Simulation Example)

In order to verify the effect of the control device 1 according to the embodiment, a simulation of a control system that controls the control amounts of first to fourth control targets from 0 to the final target value (=100) was performed. The first to fourth control targets are assumed to have the transmission characteristics shown by the following [Equation 3].

$$G(s) = \frac{K}{(1+T_1 s)(1+T_2 s)} e^{-Ls} \qquad \text{[Equation 3]}$$

In [Equation 3], K is a steady-state gain; $T_1$ and $T_2$ are time constants; and L is a dead time. The first control loop corresponding to the first control target was set as the reference control loop, and the second to fourth control loops corresponding to the second to fourth control targets were set as the follow-up control loops. That is, the value of each parameter was set so that the response characteristic of the first control loop is the slowest; the response characteristic of the second control loop is the second slowest; the response characteristic of the third control loop is the third slowest; and the response characteristic of the fourth control loop is the fastest. Specifically, the values of K, $T_1$, $T_2$, and L were set as follows. Further, the values corresponding to the first, second, third, and fourth control targets are shown from the left in square brackets.

K=[3.5, 4, 4.5, 5]
$T_1$=[39, 36, 33, 30]
$T_2$=[3.5, 3, 2.5, 2]
L=[1.6, 1.4, 1.2, 1]
The unit of $T_1$, $T_2$ and L is seconds.

The first to fourth model prediction control modules generate the operation amounts for the first to fourth control targets by model prediction control using the dynamic characteristic models of the first to fourth control targets, respectively. The dynamic characteristic model is assumed to have the above transmission characteristics. Therefore, the model error is 0. Further, the control cycle in which the operation amount is output is set to 0.1 s.

Figure 7:
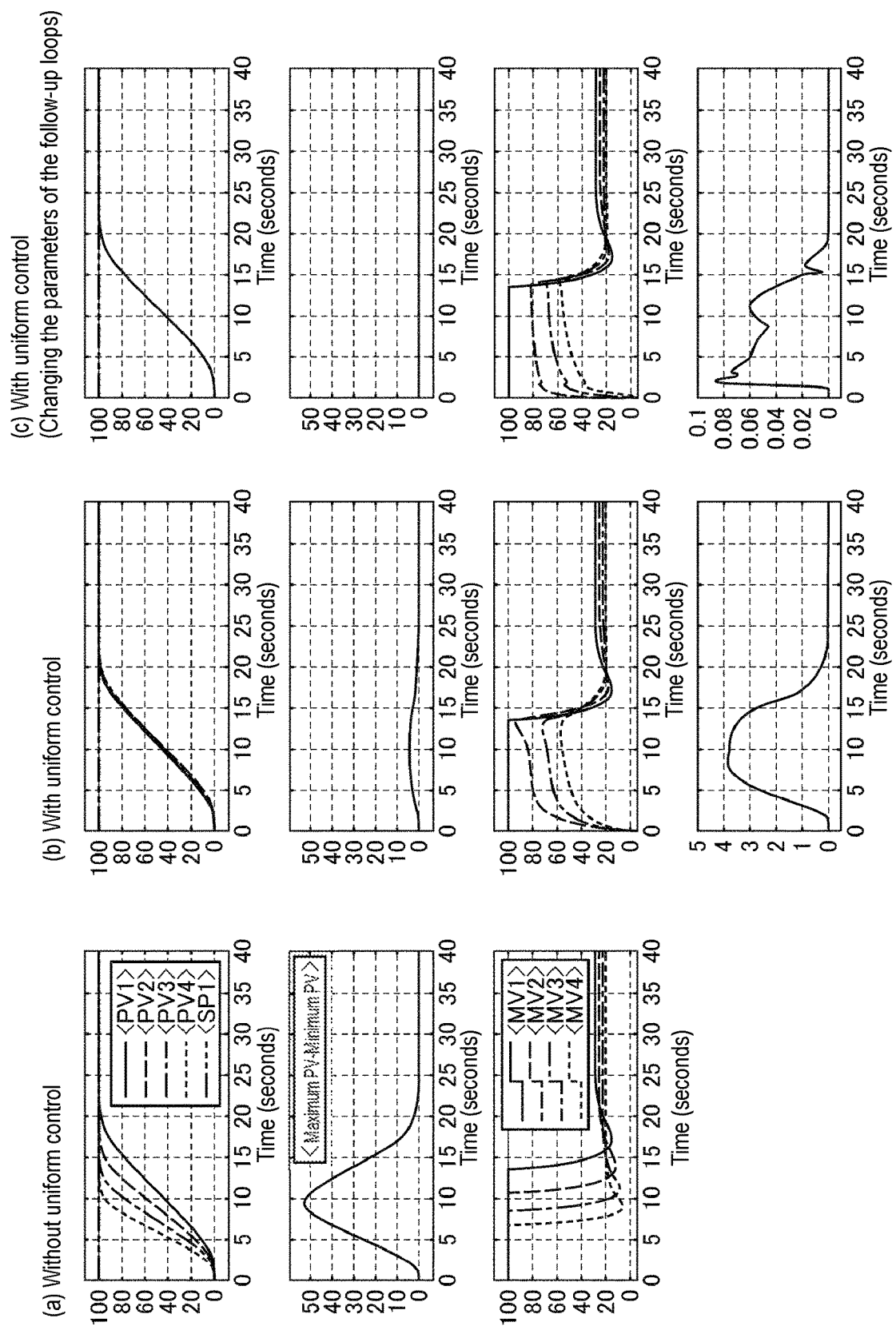
FIG. 7 is a diagram showing simulation results when there is no disturbance.

FIG. 7 is a diagram showing simulation results when there is no disturbance. In FIG. 7, (a) in the left column shows the simulation result when the same target value SP (=100) was input to all the control loops. That is, the step-like target value is input to all the control loops.

The middle column (b) and the right column (c) show the simulation results when the target value SP1 (=100) was input to the reference control loop, and the target values generated by the target value generation module 14 were input to the follow-up control loops. That is, the step-like target value was input only to the reference control loop.

Further, (a) and (b) of FIG. 7 show the simulation results when the prediction horizons H1 and H2 and the reference orbit time constant Tr, which are model prediction control parameters, are set as follows. The values of the first, second, third, and fourth control loops are shown from the left in square brackets.

H1=[35, 30, 25, 20]
H2=[70, 60, 50, 40]
Tr=[1.6, 1.4, 1.2, 1]

Further, (c) of FIG. 7 shows the simulation result when the prediction horizons H1 and H2 and the reference orbit time constant Tr are set as follows.

H1=[35, 8, 6, 5]
H2=[70, 16, 12, 10]
Tr=[1.6, 0, 0, 0]

As described above, in the example shown in (c) of FIG. 7, the prediction horizons H1 and H2 and the reference orbit time constant Tr of the follow-up control loops are made smaller than the examples shown in (a) and (b) of FIG. 7.

The first row of each column in FIG. 7 shows the temporal change between the control amounts PV1 to PV4 of the first to fourth control loops and the target value SP1 input to the first control loop (reference control loop). The second row of each column in FIG. 7 shows the temporal change of the deviation between the maximum control amount (maximum PV) and the minimum control amount (minimum PV) in all the control loops. The third row of each column in FIG. 7 shows the temporal change of the operation amounts MV1 to MV4 generated in the first to fourth control loops. The fourth rows of (b) and (c) of FIG. 7 show an enlarged view of the deviation between the maximum PV and the minimum PV of the second row.

As shown in (a) of FIG. 7, when the same step-like target value is input to all the control loops, due to the difference in response speed, in the transient state before the target value is reached, variation in the control amounts occurs. In the example shown in (a) of FIG. 7, the deviation between the maximum PV and the minimum PV in all the control loops reaches a maximum of 50 with respect to the target value (=100).

On the other hand, as shown in (b) of FIG. 7, by inputting the target values generated by the target value generation module 14 into the follow-up control loops, in the transient state before the final target value is reached, the variation in the control amounts is suppressed. In the example shown in (b) of FIG. 7, the deviation between the maximum PV and the minimum PV in all the control loops is suppressed to less than 4 with respect to the target value (=100).

The operation amount MV1 of the reference control loop (first control loop) is set to an upper limit value of 100 from the start of control until the control amount PV1 approaches the target value (=100). That is, the operation amount is saturated. Therefore, it is possible to suppress a long settling time of the reference control loop. The settling time of the control system as a whole depends on the settling time of the reference control loop, which has the slowest response speed. Therefore, the settling time of the control system as a whole is not different between the example shown in (a) of FIG. 7 and the example shown in (b) of FIG. 7.

In this way, it was confirmed that the control amounts of multiple control targets in the transient state can be made uniform without sacrificing the settling time.

In the example shown in (c) of FIG. 7, the deviation between the maximum PV and the minimum PV in all the control loops is further suppressed as compared with (b) of FIG. 7.

Figure 8:
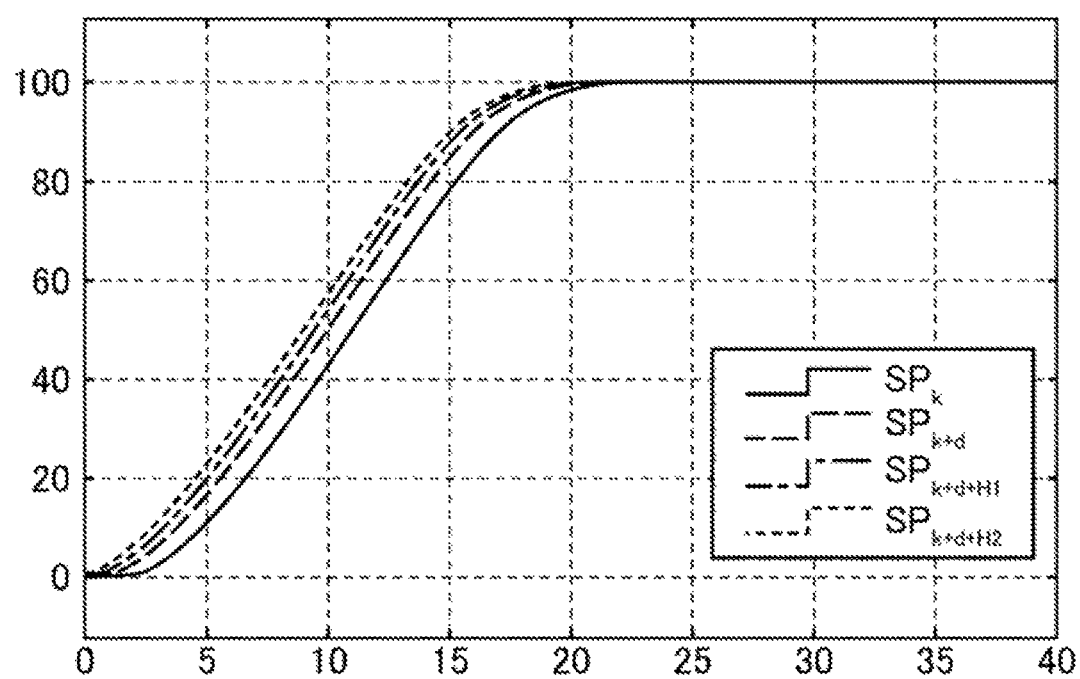
FIG. 8 is a diagram showing the temporal change of the target values input to the follow-up control loops.

FIG. 8 is a diagram showing the temporal change of the target values input to the follow-up control loops in the example shown in (c) of FIG. 7. FIG. 8 shows the target value input to the fourth control loop having the fastest response speed. As described above, in order to perform model prediction control, the target value $SP_{k+d}$ of the control cycle in which the dead time d has elapsed from the current control cycle k, the target value $SP_{k+d+H1}$ of the control cycle in which d+H1 has elapsed from the current control cycle k, and the target value $SP_{k+d+H2}$ of the control cycle in which d+H2 has elapsed from the current control cycle k are input. Further, the target value $SP_k$ of the current control cycle k may also be input. As shown in FIG. 8, the target values $SP_k$, $SP_{k+d}$, $SP_{k+d+H1}$, and $SP_{k+d+H2}$ continuously increase toward the final target value (=100) with the passage of time. In the follow-up control loops, since the operation amounts are generated according to the target values generated from the control amount prediction value PVP of the reference control loop (first control loop), they are controlled to follow the control amount PV1 of the reference control loop.

As shown in FIG. 8, in the follow-up control loops, since the target values continuously increase, it is difficult to overshoot even if the control is strengthened. Therefore, in the example shown in (c) of FIG. 7, the control of the follow-up control loops is strengthened by making the prediction horizons H1 and H2 and the reference orbit time constant Tr of the follow-up control loops smaller than in the example shown in (b) of FIG. 7, and the control amounts of the follow-up control loops accurately follow the control amount of the reference control loop.

F-2. Second Simulation Example

Unlike the first simulation example, a simulation was performed in which a disturbance was applied to the reference control loop. Specifically, the disturbance was added to the operation amount of the reference control loop.

Figure 9:
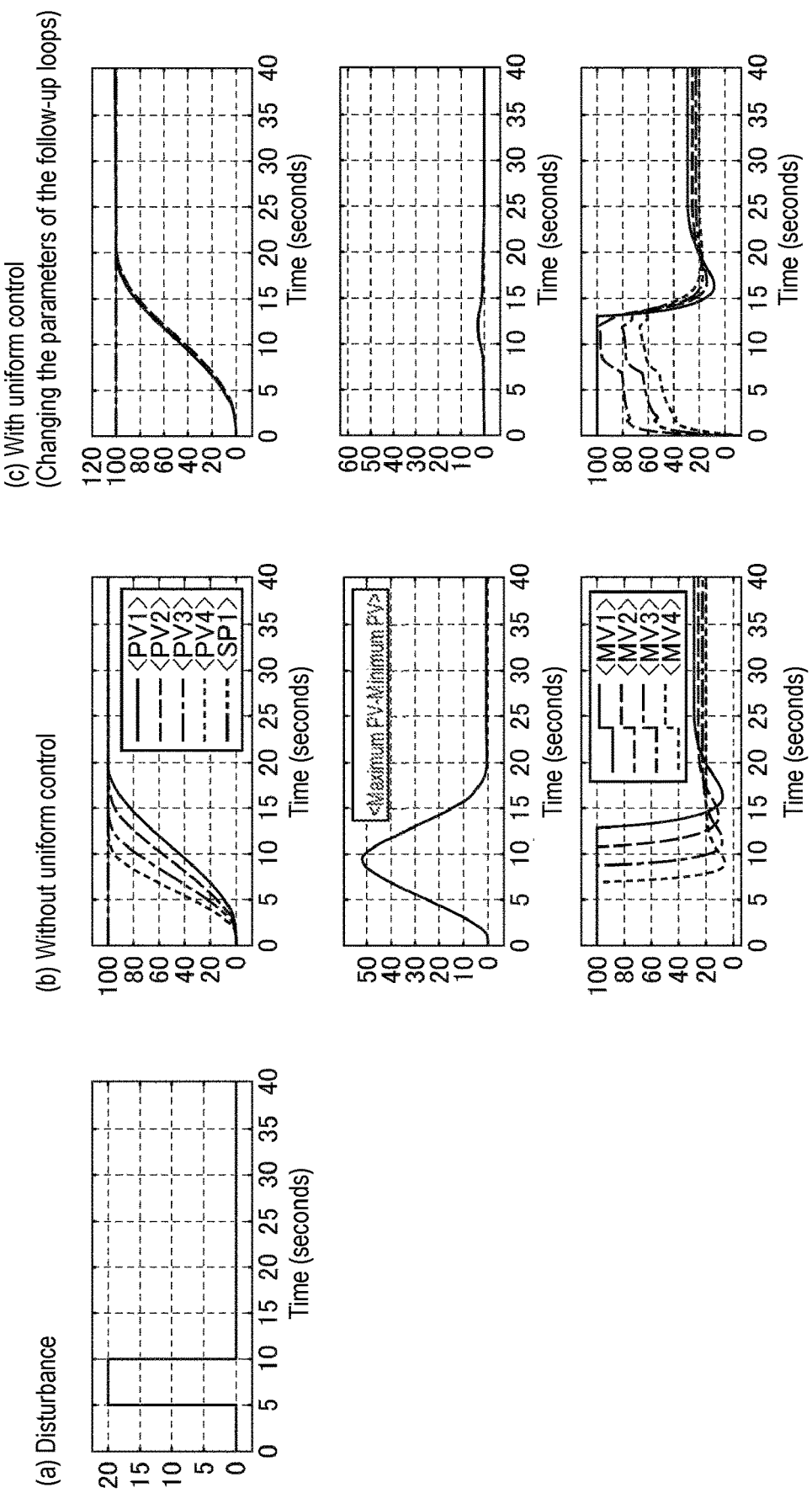
FIG. 9 is a diagram showing simulation results when there is a disturbance.

FIG. 9 is a diagram showing simulation results when there is a disturbance. In FIG. 9, (a) in the left column shows the temporal change of the disturbance applied to the reference control loop (first control loop). In this example, the disturbance was applied during the period of 5 to 10 seconds. Further, the control start time was set to 0. In FIG. 9, (b) in the middle column shows the simulation result when the same step-like target value SP (=100) was input to all the control loops. The right column (c) shows the simulation result when the step-like target value SP1 (=100) was input to the reference control loop, and the target values generated by the target value generation module 14 were input to the follow-up control loops.

Further, in the example shown in (c) of FIG. 9, the prediction horizons H1 and H2 and the reference orbit time constant Tr having the same values as those shown in the example shown in (c) of FIG. 7 were set.

The first rows of (b) and (c) of FIG. 9 show the temporal change between the control amounts PV1 to PV4 of the first to fourth control loops and the target value SP1 input to the reference control loop (first control loop). The second rows of (b) and (c) of FIG. 9 show the temporal change of the deviation between the maximum control amount (maximum PV) and the minimum control amount (minimum PV) in all the control loops. The third rows of (b) and (c) of FIG. 9 show the temporal change of the operation amounts MV1 to MV4 generated in the first to fourth control loops.

Due to the application of the disturbance, the response of the reference control loop (first control loop) is slightly faster in the example shown in (b) of FIG. 9 than in the example shown in (a) of FIG. 7. Further, in the example shown in (b) of FIG. 9, the minimum value of the operation amount of the reference control loop is smaller than that in the example shown in (a) of FIG. 7.

As shown in (c) of FIG. 9, there is an increase in the operation amounts MV2 to MV4 of the follow-up control loops (second to fourth control loops) in the period from about 7 seconds to about 12 seconds, which is slightly later than the period when the disturbance is applied. This is because the influence of the disturbance appears in the control amount of the reference control loop, and the control amount prediction values and the future target values of the follow-up control loops increase accordingly. In this way, since the future target values of the follow-up control loops change according to the control amount of the reference control loop, the deviation between the maximum PV and the minimum PV in all the control loops is suppressed.

As described above, it was confirmed that even when the response of the reference control loop changes due to the influence of disturbance or the like, the distribution of the control amounts of multiple control targets can be uniformly controlled in the transient state.

G. ADVANTAGES

As described above, the control device 1 according to the embodiment includes multiple model prediction control modules 10-1 to 10-$n$ that control the multiple control targets 20-1 to 20-$n$, respectively. That is, the model prediction control module 10-$i$ is a control part for controlling the control target 20-$i$. Each of the model prediction control modules 10-1 to 10-$n$ determines the operation amount MV for the corresponding control target so that the control amount PV of the corresponding control target matches the target value SP for each control cycle.

The model prediction control modules 10-1 to 10-$n$ include the model prediction control module 10-1 having the slowest response speed of the control amount PV with respect to the target value SP, and the model prediction control modules 10-2 to 10-$n$ other than the model prediction control module 10-1.

The control device 1 further includes the control amount prediction module 12 and the target value generation module 14. The control amount prediction module 12 predicts the future control amount (control amount prediction value PVP) of the control target 20-1 by using a dynamic characteristic model showing the dynamic characteristics of the control target 20-1 corresponding to the model prediction control module 10-1 for each control cycle. The target value generation module 14 generates the control amount prediction value PVP as the future target values of the control targets 20-2 to 20-$n$ corresponding to the model prediction control modules 10-2 to 10-$n$, respectively. The model prediction control modules 10-2 to 10-$n$ determine the operation amounts MV2 to MVn for the control targets 20-2 to 20-$n$ based on the future target values, respectively.

According to the above configuration, the model prediction control module 10-$j$ (j is an integer of 2 to n) generates the operation amount MVj so that the control amount PVj of the control target 20-$j$ follows the control amount prediction value PVP, and outputs the generated operation amount MVj to the control target 20-$j$. As a result, the control targets 20-1 to 20-$n$ are controlled so that the distribution of the control amounts in the transient state becomes a uniform distribution.

Further, the control amount prediction value PVP is predicted for each control cycle. Therefore, even when a disturbance or the like is applied to the reference control loop L1 corresponding to the control target 20-1 and the response of the reference control loop L1 changes, the control amount prediction value PVP is predicted according to the response after the change. As a result, even when the response changes due to the influence of disturbance or the like, the distribution of the control amounts of the control targets 20-1 to 20-$n$ can be restored to a uniform distribution in the transient state.

The settling time of the control system SYS as a whole depends on the settling time of the reference control loop L1, which has the slowest response speed. The model prediction control module 10-1 of the reference control loop L1 determines the operation amount MV1 for the control target 20-1 based on the step-like target value SP1. As a result, even if the distribution of the control amount of the control target 20-1 is controlled to be a uniform distribution, it is possible to suppress the lengthening of the settling time of the control system SYS as a whole. That is, the control amounts of the control targets 20-1 to 20-$n$ in the transient state can be made uniform without sacrificing the settling time of the control system SYS as a whole.

The model prediction control module 10-1 calculates the model input value MVP to the dynamic characteristic model of each control cycle by model prediction control using the dynamic characteristic model corresponding to the control target 20-1 so that the required change amount for making the control amount PV1 of the control target 20-1 match the target value SP1 is output from the dynamic characteristic model. Then, the model prediction control module 10-1 determines the model input value MVP of the current control cycle as the operation amount MV1 for the control target 20-1. The control amount prediction module 12 predicts the control amount prediction value PVP by inputting the model input value MVP of the control cycle after the current control cycle into the dynamic characteristic model. As a result, the control amount prediction module 12 can predict the control amount prediction value PVP by using the calculation result of the model prediction control module 10-1. As a result, the calculation load is reduced.

When the model input value MVP exceeds the predetermined upper limit value MVH, the model prediction control module 10-1 corrects the model input value MVP to the upper limit value MVH, and when the model input value MVP is lower than the predetermined lower limit value MVL, the model prediction control module 10-1 corrects the model input value MVP to the lower limit value MVL. As a result, the model output is calculated using the operation amount MV corrected to the upper limit value MVH or the lower limit value MVL due to saturation, and a decrease in prediction accuracy can be avoided.

The model prediction control module 10-$j$ (j is an integer of 2 to n) determines the operation amount MVj for the control target 20-$j$ by performing model prediction control using a dynamic characteristic model showing the dynamic characteristics of the corresponding control target 20-$j$. As a result, the model prediction control module 10-$j$ can generate the operation amount MVj using the future target value SPj generated by the target value generation module 14.

H. MODIFIED EXAMPLES

H-1. Modified Example 1

In the above description, an example in which the distribution of the control amounts of multiple control targets in the transient state is made a uniform distribution has been described. However, the control targets may be controlled so that the distribution of the control amounts of the control targets in the transient state becomes a desired distribution other than the uniform distribution.

For example, there may be a request that the control amounts of the follow-up control loops be controlled so as to have a difference of a predetermined bias with respect to the control amount of the reference control loop. When responding to this request, the target value generation module 14 may generate values obtained by adding the predetermined bias to the control amount prediction value PVP as the future target values of the follow-up control loops.

Figure 10:
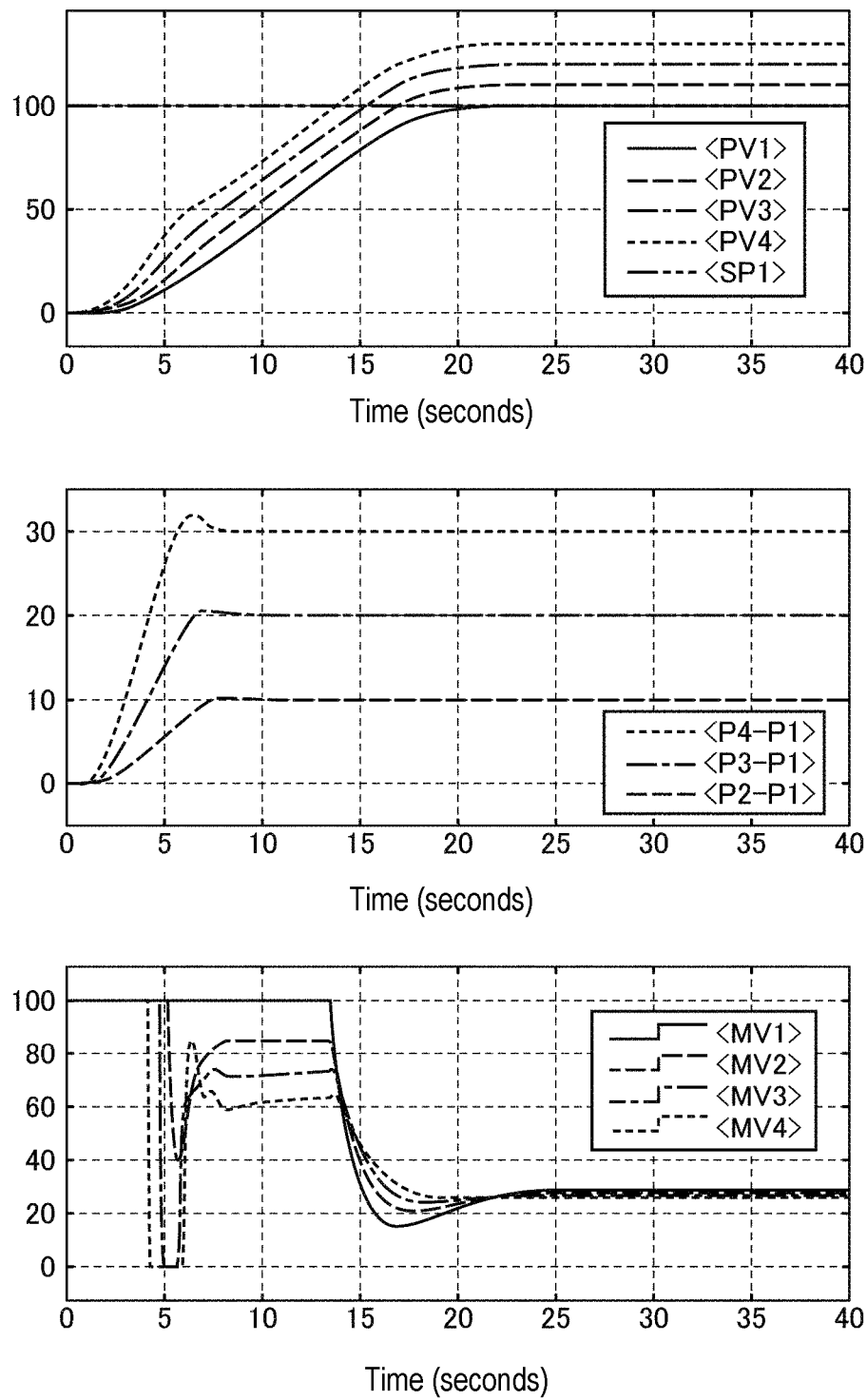
FIG. 10 is a diagram showing a simulation result when values obtained by adding the predetermined bias to the control amount prediction value are set as the target values of the follow-up control loops.

FIG. 10 is a diagram showing a simulation result when values obtained by adding the predetermined bias to the control amount prediction value are set as the target values of the follow-up control loops. The first row shows the temporal change between the control amounts PV1 to PV4 of the first to fourth control loops and the target value SP1 input to the reference control loop (first control loop). The second row shows the temporal change of the deviation between each of the control amounts PV2, PV3, and PV4 of the follow-up control loops and the control amount PV1 of the reference control loop. The third row shows the temporal change of the operation amounts MV1 to MV4 generated in the first to fourth control loops.

FIG. 10 shows an example in which the final target values of the second to fourth control loops, which are the follow-up control loops, have a difference of +10, +20, and +30 with respect to the final target value (=100) of the reference control loop (first control loop). Therefore, the target value generation module 14 generates values obtained by adding +10, +20, and +30 to the control amount prediction value PVP as the future target values of the second to fourth control loops, respectively. As a result, as shown in FIG. 10, from the early stage after the start of control (after about 7 seconds have elapsed), the control amounts PV2 to PV4 of the second to fourth control loops have differences of +10, +20, and +30 with respect to the control amount PV1 of the reference control loop, respectively. As described above, it was confirmed that the first to fourth control targets can be controlled so that the control amounts of the follow-up control loops have a distribution having a difference of a predetermined bias with respect to the control amount of the reference control loop in the transient state.

Alternatively, there may be a request that the control amounts of the follow-up control loops be controlled so as to have a predetermined ratio with respect to the control amount of the reference control loop. When responding to this request, the target value generation module 14 may generate values obtained by multiplying the control amount prediction value PVP by the predetermined ratio as the future target values of the follow-up control loops.

Figure 11:
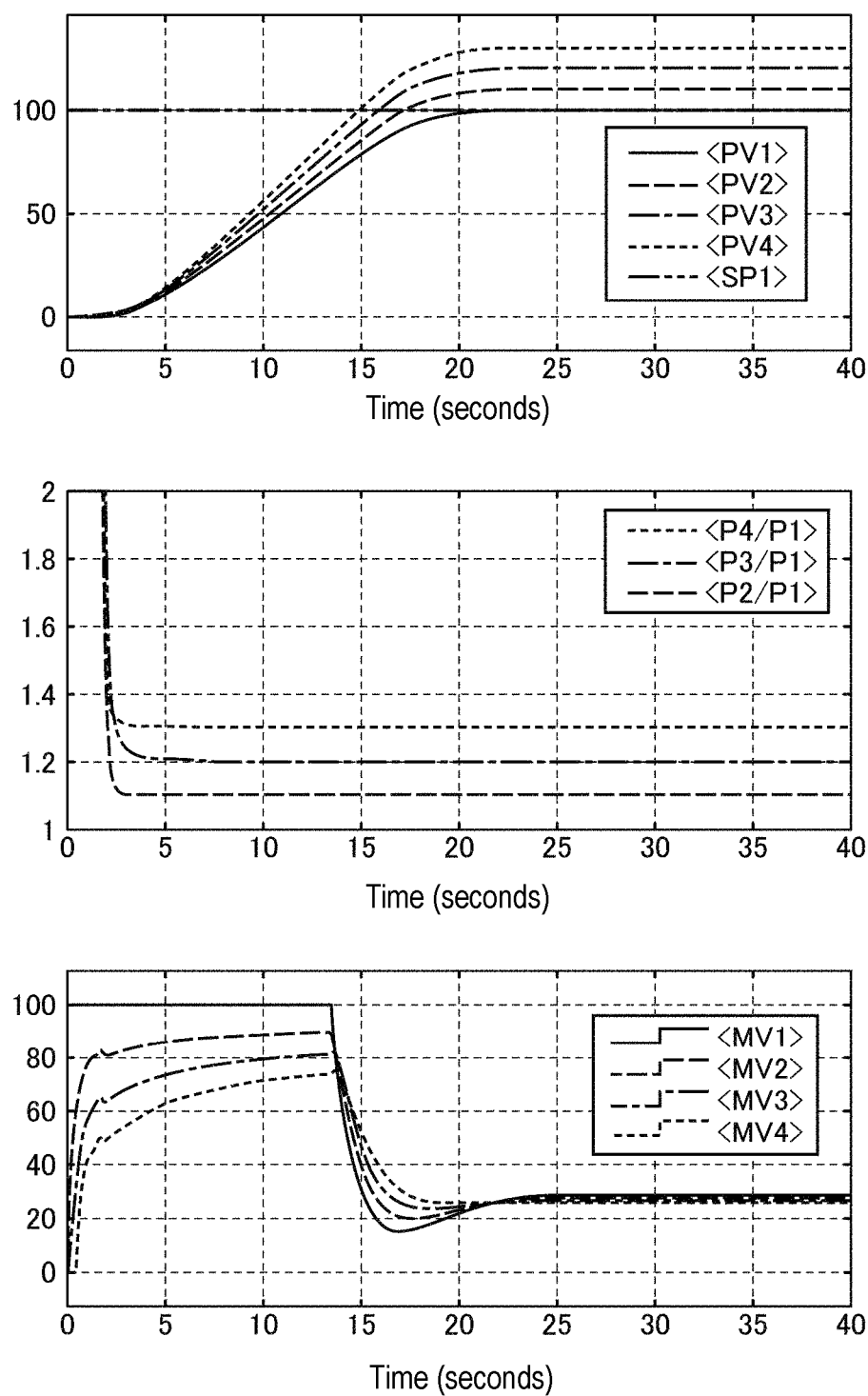
FIG. 11 is a diagram showing a simulation result when values obtained by multiplying the control amount prediction value by the predetermined ratio are set as the target values of the follow-up control loops.

FIG. 11 is a diagram showing a simulation result when values obtained by multiplying the control amount prediction value by the predetermined ratio are set as the target values of the follow-up control loops. The first row shows the temporal change between the control amounts PV1 to PV4 of the first to fourth control loops and the target value SP1 input to the reference control loop (first control loop). The second row shows the temporal change of the ratio of each of the control amounts PV2, PV3, and PV4 of the follow-up control loops with respect to the control amount PV1 of the reference control loop. The third row shows the temporal change of the operation amounts MV1 to MV4 generated in the first to fourth control loops. FIG. 11 shows an example in which the final target values of the second to fourth control loops, which are the follow-up control loops, have a ratio of 1.1 times, 1.2 times and 1.3 times with respect to the final target value (=100) of the reference control loop (first control loop). Therefore, the target value generation module 14 generates values obtained by multiplying the control amount prediction value PVP by 1.1, 1.2, and 1.3 as the future target values of the second to fourth control loops, respectively. As a result, as shown in FIG. 11, immediately after the start of control, the control amounts PV2 to PV4 of the second to fourth control loops have ratios of 1.1, 1.2, and 1.3 with respect to the control amount PV1 of the reference control loop, respectively. As described above, it was confirmed that the first to fourth control targets can be controlled so that the control amounts of the follow-up control loops have a distribution that has a predetermined ratio with respect to the control amount of the reference control loop in the transient state.

H-2. Modified Example 2

In the above description, an example of controlling multiple control targets included in the heating device 2 has been described. However, the control device 1 may control multiple control targets included in other devices or systems.

For example, multiple control targets may have valves, and the control device 1 may adjust the opening degree of the valves to control the pressure, the flow rate, or the load as the control amounts of the multiple control targets.

I. APPENDIX

As described above, the embodiments and modified examples include the following disclosure.
(Configuration 1)
1. A control device (1) including a plurality of control parts (10-1 to 10-$n$) for controlling a plurality of control targets (20-1 to 20-$n$),
wherein each of the control parts (10-1 to 10-$n$) determines an operation amount for a corresponding control target among the control targets (20-1 to 20-$n$) so that a control amount of the corresponding control target matches a target value for each control cycle, and
the control parts (10-1 to 10-$n$) include a first control part (10-1) having a slowest response speed of the control amount with respect to the target value and a second control part (10-2 to 10-$n$) other than the first control part, and wherein the control device (1) further includes:
a prediction part (12) for predicting a future control amount of a first control target (20-1) that corresponds to the first control part (10-1) among the control targets (20-1 to 20-$n$) by using a first model showing dynamic characteristics of the first control target (20-1) for each control cycle; and
a generation part (14) for generating a future target value of a second control target (20-2 to 20-$n$) that corresponds to the second control part (10-2 to 10-$n$) among the control targets (20-1 to 20-$n$) from the future control amount,
wherein the second control part (10-2 to 10-$n$) determines the operation amount for the second control target (20-2 to 20-$n$) based on the future target value.

(Configuration 2)

The control device (1) according to Configuration 1, wherein the first control part (10-1) determines the operation amount for the first control target (20-1) based on a step-like target value.

(Configuration 3)

The control device (1) according to Configuration 1 or Configuration 2,
wherein the first control part (10-1)
calculates an input value to the first model of each control cycle by model prediction control using the first model so that a required change amount for making the control amount of the first control target (20-1) match the target value is output from the first model, and
determines the input value of a current control cycle as the operation amount to the first control target (20-1), and
wherein the prediction part (12) predicts the future control amount by inputting the input value of a control cycle after the current control cycle into the first model.

(Configuration 4)

The control device (1) according to Configuration 3, wherein when the input value exceeds a predetermined upper limit value, the first control part (10-1) corrects the input value to the upper limit value, and when the input value is lower than a predetermined lower limit value, the first control part (10-1) corrects the input value to the lower limit value.

(Configuration 5)

The control device (1) according to any one of Configurations 1 to 4, wherein the second control part (10-2 to 10-$n$) determines the operation amount for the second control target (20-2 to 20-$n$) by model prediction control using a second model showing dynamic characteristics of the second control target (20-2 to 20-$n$).

(Configuration 6)

The control device (1) according to any one of Configurations 1 to 5, wherein the generation part (14) generates the future control amount, a value obtained by adding a predetermined bias to the future control amount, or a value obtained by multiplying the future control amount by a predetermined ratio as the future target value.

(Configuration 7)

The control device (1) according to any one of Configurations 1 to 6, wherein the control amount is a temperature, a pressure, a flow rate or a load.

(Configuration 8)

A control method of a control system (SYS) including a plurality of control parts (10-1 to 10-$n$) respectively corresponding to a plurality of control targets (20-1 to 20-$n$),
wherein each of the control parts (10-1 to 10-$n$) determines an operation amount for a corresponding control target among the control targets (20-1 to 20-$n$) so that a control amount of the corresponding control target matches a target value, and
the control parts (10-1 to 10-$n$) include a first control part (10-1) having a slowest response speed of the control amount with respect to the target value and a second control part (10-2 to 10-$n$) other than the first control part, and
wherein the control method includes:
predicting a future control amount of a first control target (20-1) that corresponds to the first control part (10-1) among the control targets (20-1 to 20-$n$) by using a first model showing dynamic characteristics of the first control target (20-1) for each control cycle;
generating a future target value of a second control target (20-2 to 20-$n$) that corresponds to the second control part (10-2 to 10-$n$) among the control targets (20-1 to 20-$n$) from the future control amount; and
outputting the future target value to the second control part (10-2 to 10-$n$) and determining the operation amount for the second control target (20-2 to 20-$n$) based on the future target value.

(Configuration 9)

A control program that causes a computer to execute a control method of a control system (SYS) including a plurality of control parts (10-1 to 10-$n$) respectively corresponding to a plurality of control targets (20-1 to 20-$n$),
wherein each of the control parts (10-1 to 10-$n$) determines an operation amount for a corresponding control target among the control targets (20-1 to 20-$n$) so that a control amount of the corresponding control target matches a target value, and
the control parts (10-1 to 10-$n$) include a first control (10-1) part having a slowest response speed of the control amount with respect to the target value and a second control part (10-2 to 10-$n$) other than the first control part,
wherein the control method includes:
predicting a future control amount of a first control target (20-1) that corresponds to the first control part (10-1) among the control targets (20-1 to 20-$n$) by using a first model showing dynamic characteristics of the first control target (20-1) for each control cycle;
generating a future target value of a second control target (20-2 to 20-$n$) that corresponds to the second control part (10-2 to 10-$n$) among the control targets (20-1 to 20-$n$) from the future control amount; and
outputting the future target value to the second control part (10-2 to 10-$n$) and determining the operation amount for the second control target (20-2 to 20-$n$) based on the future target value.

Although embodiments of the disclosure have been described, it should be considered that the embodiments disclosed herein are exemplary in all respects and not restrictive. The scope of the disclosure is defined by the claims, and is intended to include all modifications within the meaning and scope equivalent to the claims.

What is claimed is:

1. A control device comprising a processor and a memory, wherein the processor is configured to read programs stored in the memory for performing control over a plurality of control targets,
wherein the processor is configured to determine an operation amount for each control target among the control targets so that a control amount of each control target matches a corresponding target value for each control cycle, wherein a first control target of the control targets exhibits a slowest response speed of the control amount with respect to the corresponding target value, as compared to second control targets among the control targets;

wherein the processor is configured for predicting a future control amount of the first control target by using a first model showing dynamic characteristics of the first control target for each control cycle;

wherein the processor is configured for generating future target values based on the predicted future control amount of the first control target for the second control targets in each control cycle;

wherein the processor is configured to determine respective operation amounts for the second control targets based on the future target values in each control cycle; and wherein the processor controls the second control targets using the determined operation amounts based on the future target values in each control cycle.

2. The control device according to claim 1, wherein the processor is configured to determines the operation amount for the first control target based on a step-like target value.

3. The control device according to claim 1,
wherein the processor is configured to
calculate an input value to the first model of each control cycle by model prediction control using the first model so that a required change amount for making the control amount of the first control target match the target value is output from the first model, and
determines the input value of a current control cycle as the operation amount to the first control target, and
wherein the processor is configured to predict the future control amount by inputting the input value of a control cycle after the current control cycle into the first model.

4. The control device according to claim 3, wherein when the input value exceeds a predetermined upper limit value, the processor is configured to corrects the input value to the upper limit value, and when the input value is lower than a predetermined lower limit value, the processor is configured to corrects the input value to the lower limit value.

5. The control device according to claim 1, wherein the processor is configured to determines the operation amount for the second control target by model prediction control using second models showing dynamic characteristics of the second control targets.

6. The control device according to claim 1, wherein the processor is configured to generates the future control amount, a value obtained by adding a predetermined bias to the future control amount, or a value obtained by multiplying the future control amount by a predetermined ratio as the future target value.

7. The control device according to claim 1, wherein the control amount is a temperature, a pressure, a flow rate or a load.

8. A control method of a control system comprising a memory and a processor, wherein the control method comprises operating the processor to read programs stored in the memory for performing control over a plurality of control targets, wherein the processor is configured to determine an operation amount for each control target among the control targets so that a control amount of each control target matches a corresponding target value, wherein a first control target of the control targets exhibits a slowest response speed of the control amount with respect to the corresponding target value, as compared to second control targets among the control targets;

wherein the processor is configured for predicting a future control amount of the first control target by using a first model showing dynamic characteristics of the first control target for each control cycle, wherein the processor is configured for generating future target values based on the predicted future control amount of the first control target for the second control targets in each control cycle, wherein the processor is configured to determine respective operation amounts for the second control targets based on the future target values in each control cycle; and wherein the processor controls the second control targets using the determined operation amounts based on the future target values in each control cycle.

9. A non-transitory computer-readable recording medium, recording a control program that causes a processor to perform control over a plurality of control targets, wherein the processor is configured to determine an operation amount for each control target among the control targets so that a control amount of each control target matches a corresponding target value, wherein a first control target in the control targets exhibits a slowest response speed of the control amount with respect to the corresponding target value, as compared to second control targets among the control targets, wherein the processor is configured for predicting a future control amount of the first control target by using a first model showing dynamic characteristics of the first control target for each control cycle, wherein the processor is configured for generating future target values based on the predicted future control amount of the first control target for the second control targets in each control cycle, wherein the processor is configured to determine respective operation amounts for the second control target based on the future target values in each control cycle; and wherein the processor controls the second control targets using the determined operation amounts based on the future target values in each control cycle.

* * * * *